US011704957B2

(12) United States Patent
Vincent et al.

(10) Patent No.: US 11,704,957 B2
(45) Date of Patent: Jul. 18, 2023

(54) METHOD AND SYSTEM FOR IDENTIFYING AND DETERMINING VALUATION OF CURRENCY

(71) Applicant: TSLOC PRODUCTIONS, INC, Voorhees, NJ (US)

(72) Inventors: Armon Vincent, Philadelphia, PA (US); Andrew George, Yeadon, PA (US); Aidan Melendez, Camden, NJ (US)

(73) Assignee: TSLoc Productions, Inc, Voorhees, NJ (US)

( * ) Notice: Subject to any disclaimer, the term of this patent is extended or adjusted under 35 U.S.C. 154(b) by 0 days.

(21) Appl. No.: 17/406,279

(22) Filed: Aug. 19, 2021

(65) Prior Publication Data

US 2023/0062007 A1    Mar. 2, 2023

(51) Int. Cl.
*G07D 5/00*      (2006.01)
*G06F 16/532*    (2019.01)
(Continued)

(52) U.S. Cl.
CPC ........... *G07D 5/005* (2013.01); *G06F 16/532* (2019.01); *G06V 10/443* (2022.01); *G06V 20/20* (2022.01);
(Continued)

(58) Field of Classification Search
CPC .. G07D 5/005; G07D 2205/00; G06F 16/532; G06V 10/443; G06V 10/751;
(Continued)

(56) References Cited

U.S. PATENT DOCUMENTS 5,493,105 A    2/1996   Desai
5,604,640 A    2/1997   Zipf et al.
(Continued)

FOREIGN PATENT DOCUMENTS

| WO | 9840839 A2 | 9/1998 | |
|----|----|----|----|
| WO | WO-9840839 A2 * | 9/1998 | ............ G06K 9/033 |
| WO | 2020142478 A1 | 7/2020 | |

OTHER PUBLICATIONS

Preliminary Report on Patentability for PCT/US2019/0690046 (filed Dec. 31, 2019); report dated Jul. 15, 2021.
(Continued)

*Primary Examiner* — Amandeep Saini
*Assistant Examiner* — Daniella M. DiGuglielmo
(74) *Attorney, Agent, or Firm* — Flaster Greenberg PC

(57) ABSTRACT

A method and system is provided for determining the denomination and related data for a currency item using a personal computing device, such as a mobile phone. The device includes or is connected to an image capture device that is preferably a digital video camera. At least one image of a target currency item is captured then processed for image quality. A further processing of the image includes a coordinate mapping. A comparison is made between individual pixels of the processed image based on the assigned coordinate mapping with a database of reference currency images to determine the currency denomination. Additional processing of the currency image provides the date and other data regarding the target currency item. A market value for the target currency item is identified by reference to a valuation database using the data determined for the currency item.

20 Claims, 10 Drawing Sheets

(51) Int. Cl.
    *G06V 10/44* (2022.01)
    *G06V 20/20* (2022.01)
    *G06V 30/18* (2022.01)
    *G06V 30/19* (2022.01)
    *G06V 30/12* (2022.01)

(52) U.S. Cl.
    CPC ...... *G06V 30/133* (2022.01); *G06V 30/18019* (2022.01); *G06V 30/19013* (2022.01); *G06V 30/1908* (2022.01); *G07D 2205/00* (2013.01)

(58) Field of Classification Search
    CPC .... G06V 10/993; G06V 20/20; G06V 10/759; G06V 30/133; G06V 30/18019; G06V 30/19013; G06V 30/1908; G06V 10/50; G06V 20/64; G06V 20/66
    See application file for complete search history.

(56) References Cited

U.S. PATENT DOCUMENTS

| | | | |
|---|---|---|---|
| 6,499,581 B2* | 12/2002 | Yoshida | G07D 5/005 382/136 |
| 6,634,482 B1 | 10/2003 | Miele | |
| 7,677,445 B2* | 3/2010 | Silverbrook | G06Q 30/0185 382/137 |
| 8,644,564 B1 | 2/2014 | Patton et al. | |
| 9,036,890 B2 | 5/2015 | Borg et al. | |
| 9,053,595 B2* | 6/2015 | Grove | G06T 7/13 |
| 9,330,517 B2 | 5/2016 | Grove | |
| 9,443,367 B2* | 9/2016 | Baltazor | G07D 5/005 |
| 2015/0127507 A1 | 5/2015 | Hall | |

OTHER PUBLICATIONS

Webster et al., "An objective video quality assessment sytem based on human perception", Proceedings of SPIE, IEEE vol. 1913, XP-002077307 (Jan. 31, 1993).
Michael, "Dagobert—A New Coin Recognition and Sorting System Parallel Algorithms View . . . ", XP093003554 (Jan. 31, 2003).
International Search Report and Written Opinion for corresponding international application No. PCT/US2022/040728 (Published as WO 2023/023233), dated Dec. 8, 2022.
CoinSnap App [printout—created Apr. 10, 2023] See also, www.coinidentifierai.com (copyright 2022) (The first appearance of the website, based upon a search on https://archive.org/web appears to be Sep. 1, 2022).

* cited by examiner

METHOD AND SYSTEM FOR IDENTIFYING AND DETERMINING VALUATION OF CURRENCY

FIELD OF THE INVENTION

A method and system is provided for identifying one or more currency items and the potential value for the currency item.

BACKGROUND OF THE INVENTION

Currency generally includes coins and paper money. Such currency items are often subject to retention and trading by collectors and enthusiasts. For various reasons, certain currency items are considered more valuable as compared to their face value. Many of the relatively valuable currency items remain in circulation, with those handling the currency being unaware of the potential value if sold to a collector or enthusiast.

Collectors and enthusiasts often have a high level of personal knowledge of what is considered collectable and, thus, more valuable. The valuation identification often requires manual reference to published data based on reported prior sales. Manual valuation identification is lengthy and requires access to multiple data sources. Because a typical person lacks the prior knowledge and is not motivated to research currency values, many valuable currency items remain in circulation without any consideration as to their potential value to a collector.

The present system is intended to assist a person in quickly determining the relevant data elements for one or more currency items and to automatically identify potential value. This quick and easy system is further intended to turn the typical person into a numismatist.

SUMMARY OF THE INVENTION

A method of and system for identifying the details of and value for a target currency item is contemplated. A personal computing device is provided, preferably in the form of a hand held mobile phone. The computing device includes—or is connected to—an image capture device and a user interface. The image capture device is preferably a digital video camera. At least one image of a target currency item is captured and stored. Preferably, images of both sides of the target currency item are captured and labeled for processing. Each image is processed to determine image quality. Once the highest quality image is determined, it is output for further processing. A coordinate map of the image may be assigned to facilitate the processing. A comparison is made between individual pixels of the mapped image with a database of reference currency images. The comparison identifies results in a match for the currency denomination. Design elements are detected during the further processing to provide date data and other identifying information. Upon matching denomination, date and other identifying information, the details are displayed on the user interface of the device. The potential value is determined by reference to a valuation database and also provided on interface of the device.

The image quality determination within the method is based on digital processing the image. Preferably, a Laplace filter performs the digital processing, with the quality determination being based on a computation of the variances within the image pixels and identification of the maximum over pixel values. The higher quality image is determined by the sharpness of the edges of the target currency or its design elements.

Where the image capture device is a digital video camera a short video burst is preferably taken—preferably of both sides of the currency. The video burst includes a plurality of individual frame images. Each of the plurality of frame images are processed to determine image quality. A determination is made as to which of the plurality image frames is of the highest quality. The highest quality image frame is selected for further processing.

The method and system may be performed within the computing device or may include communication with remote processors and a master database. The processed and determined data for the target currency items may be appropriately stored within the master database. The valuation database and user database are also included within the master database. The user database preferably comprises the images of the target currency items and their associated denomination, date data, other identifying information, and determined value information. The elements of the master database may be located in one or more locations.

Wherein the method and system is applied to a target currency item that is a coin, the coordinate assignment of the image may include first assigning a polar coordinate mapping and converting the polar coordinate map to a Cartesian coordinate map.

Other features and advantages of the contemplated method and system will become apparent after a review of the detailed description and the appended claims.

BRIEF DESCRIPTION OF THE DRAWINGS

For the purpose of illustrating the invention, the drawings show one or more forms that are presently preferred. It should be understood that the invention is not limited to the precise arrangements and instrumentalities shown in the drawings.

DETAILED DESCRIPTION

Figure 1:
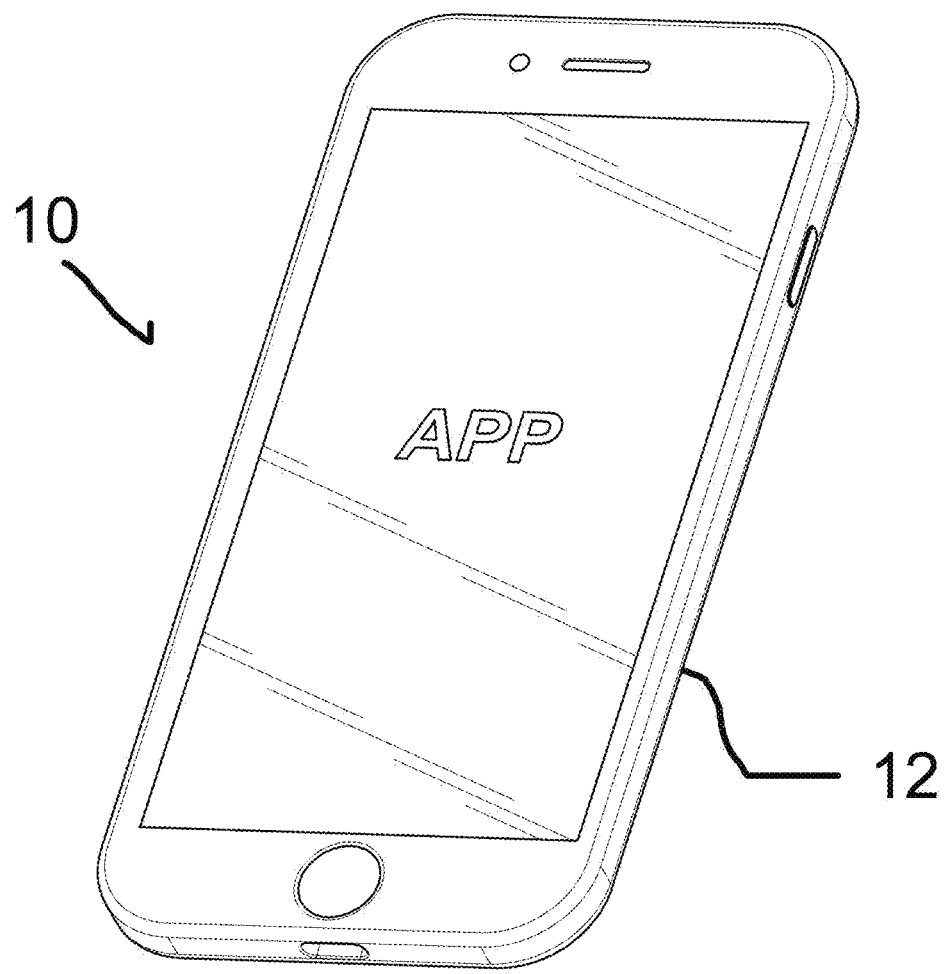
FIG. 1 shows a hand held computing device having a software app thereon for identifying the potential value of a target currency item.

In the figures, where like numerals identify like elements, there is shown in FIG. 1 an embodiment of a hand held computing device to be used in a currency identification and valuation method and system. The device is identified by the number 12 and as shown is a generic mobile phone. The method and system contemplate the use of an application or app 10 loaded onto the device 12, with the app 10 interacting with the operating system and hardware included on the device 12. The device 12 includes a user interface for input of information and for display of information generated through the method and system.

As a first step, after the app 10 has been initiated on the device 12, is the creation of a digital image of a target currency item. Preferably, upon initiating the app 10, a determination is made as to whether the device 12 includes or is connected to an image capture means, such as a digital camera. The preferred default image capture means is a digital video camera. The app 10 determines whether it is authorized to access the video camera on or connected to the device 12. If the video camera is available for use, the app 10 will prepare to record a short burst of video. Each second of video typically contains multiple—for example 30—individual image frames. The length of the video burst to be recorded may vary as desired, but is preferably 2 seconds long.

If access to a video camera is determined to not be available or not authorized, then a still camera becomes the default image capture means. The app 10 prepares to take a single image or multiple images using the camera. If the fallback still camera is not available or accessible, an error message will preferably be displayed through the interface of the device 12. The preferred use of video is intended to mitigate the potential for capturing a blurry or otherwise compromised single frame image. It is understood that over 95% of mobile phones allow capture of digital video. Hence, the single frame image is the fallback for a small number of mobile devices. Other types of computing devices and alternate image capture means may be used. These other devices, such as laptop computers, often include or can be connected to a video camera or other image capture means.

Figure 2:
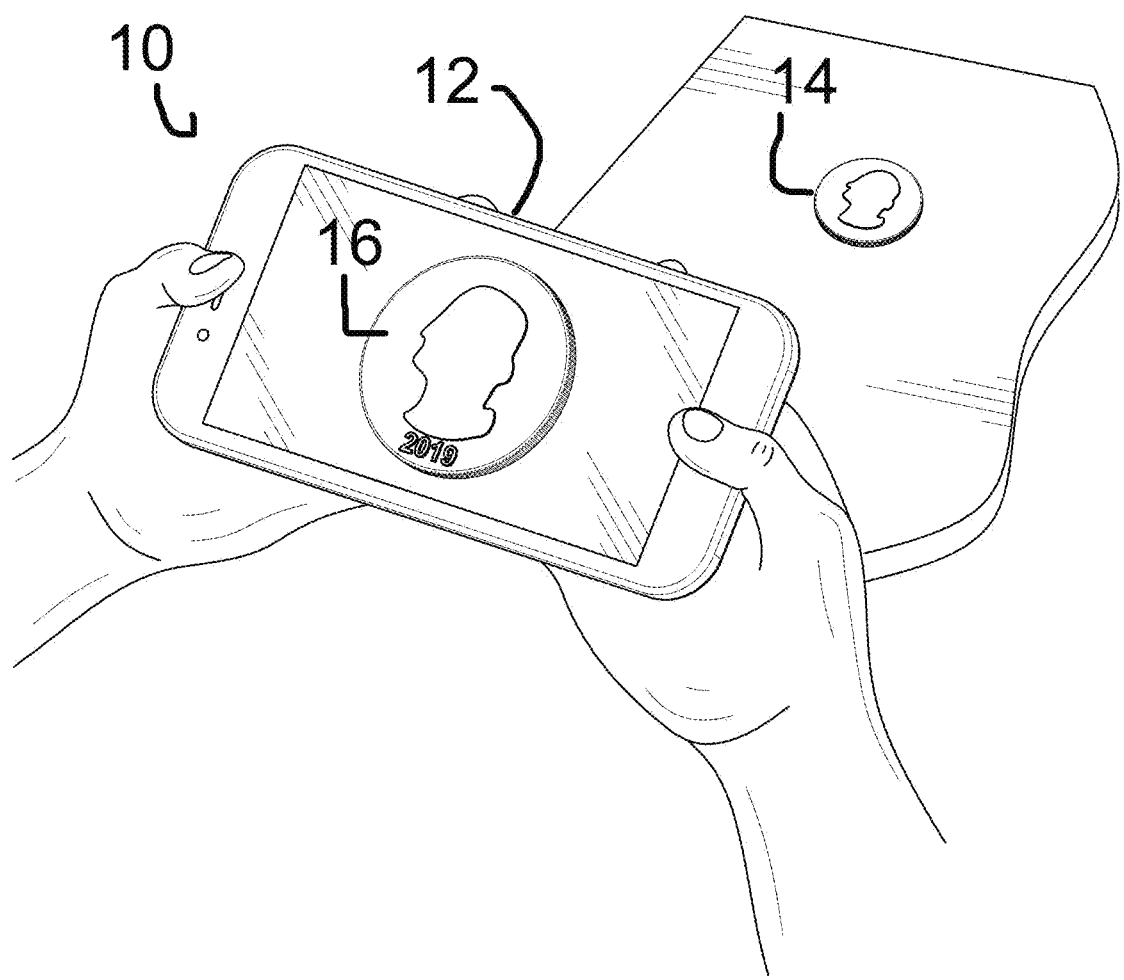
FIG. 2 shows the use of the computing device to capture an image of a target currency item in the form of a coin.

Once the camera is found to be present and accessible, the interface preferably displays a prompt for the user to create an image of both the front (heads) and back (tails) of the target currency. The user will then select "front" on the interface and initiate a video burst. In FIG. 2 the user is shown using the device 12 to create an image 16 of the front of a target currency item 14. The currency example of item 14 is a coin and will be referred to in the following description. It should be understood that other types of currency, including paper money, and potentially other valuable items may be processed by the method and system.

The app 10 preferably projects a bracket or positioning frame on the interface of the device that works with the lens of the camera. Preferably, for coins, the bracket is round. The user will be prompted to fill the round bracket with the coin image, before taking the digital image. The bracket will serve to crop the image to include only the essential portions of the coin 14 for further processing. As such, it is preferred that the portion of the image of a coin to be processed is inside the circle. The remaining portions of the digital image are ignored.

Figure 3:
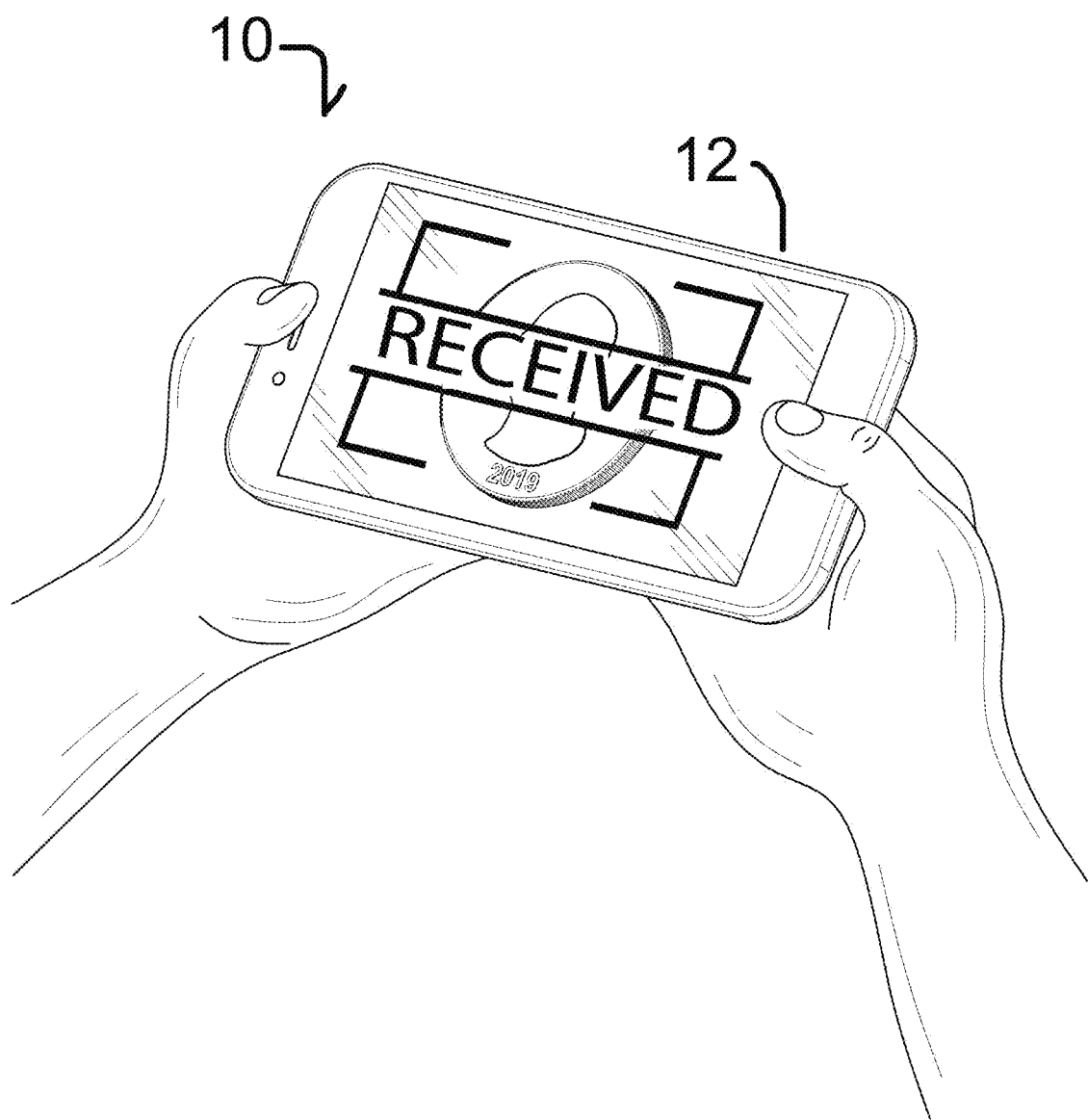
FIG. 3 shows a confirmation of receipt of a captured image on the interface of the computing device.

Once the focus and position of the coin 14 are achieved, sensors within the interface or as part of the camera may automatically activate the camera. Alternatively, the app 10 may request through the interface that the user initiate the image capture. The interface preferably prompts the user to also take a "rear" image of the target coin 14. The image capture of the rear of the coin is initiated in a similar manner as the coin front. The interface may further prompt the user to manually input basic information regarding the target coin. For example, the denomination (quarter, nickel, dime, etc.) may be input in addition to the process determination for the target coin. As shown in FIG. 3, once the image is received, an acknowledgement is provided on the interface. The captured image(s) may also be transferred to a remoted storage means. Remote storage and other database access requires that the device 12 be capable of communication with a local or remote network.

Figure 4:
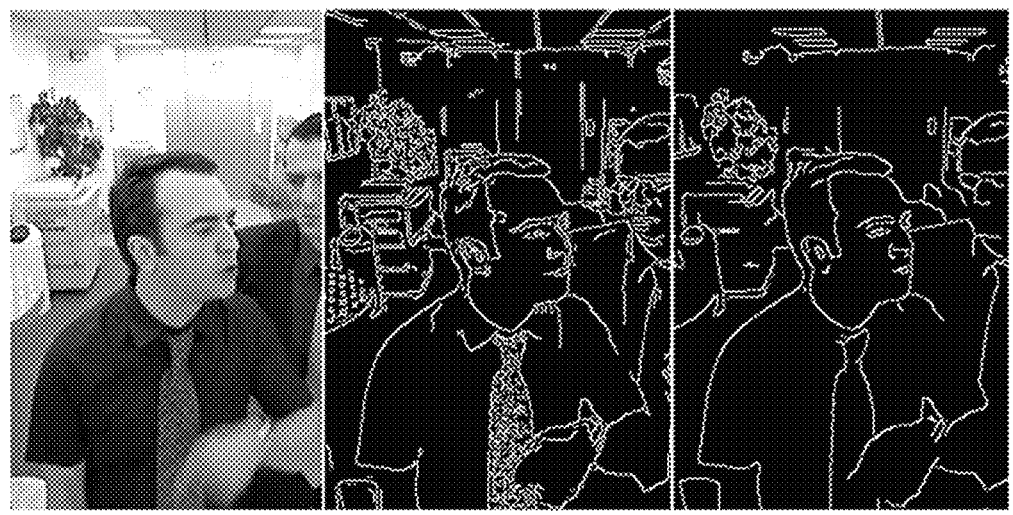
FIG. 4 shows an example of a filtering process for an image to highlight the edges of the constituent elements of the image.

The captured video is first processed to determine image quality. Preferably, the quality processing of the individual video frames is performed by a digital filtering means. The filtering means may be incorporated into the app 10 loaded on the device 12 or preferably is included in a remote or cloud based processor. The filter means processes each individual frame from the video capture to highlight certain elements of the target coin 14. A Laplace filter is preferably used in the image processing to detect edges of the target coin. A Sobel filter also emphasizes detected edges and is an alternative image filter means. Other image filter means may be used in conjunction with the Laplace or Sobel filters or as a substitute therefore. In the initial filtering of the digital image, the outside edges of the coin are preferably used as the basis for the image quality. Alternatively or in addition to the outside coin edges, the design elements or objects on the coin and included within an image are referenced. In FIG. 4 there is graphically shown the filtering process contemplated through the use of a Laplace filter, wherein the edges of image elements are systematically highlighted and refined.

The filtering process in the initial stage is used to determine whether the individual images are of sufficient quality (focus, contrast, etc.) and then selecting the highest quality image. The quality evaluation may be based on a computation of the variances and identification of the maximum over pixel values. A high variance (and a high maximum) suggests clear and distinguishable edges and thus a sharp image. Low variance typically indicates a blurred image. Once all the video image frames are processed, the sharpest image of each of the two sides of the coin are selected and become the output images.

Figure 8:
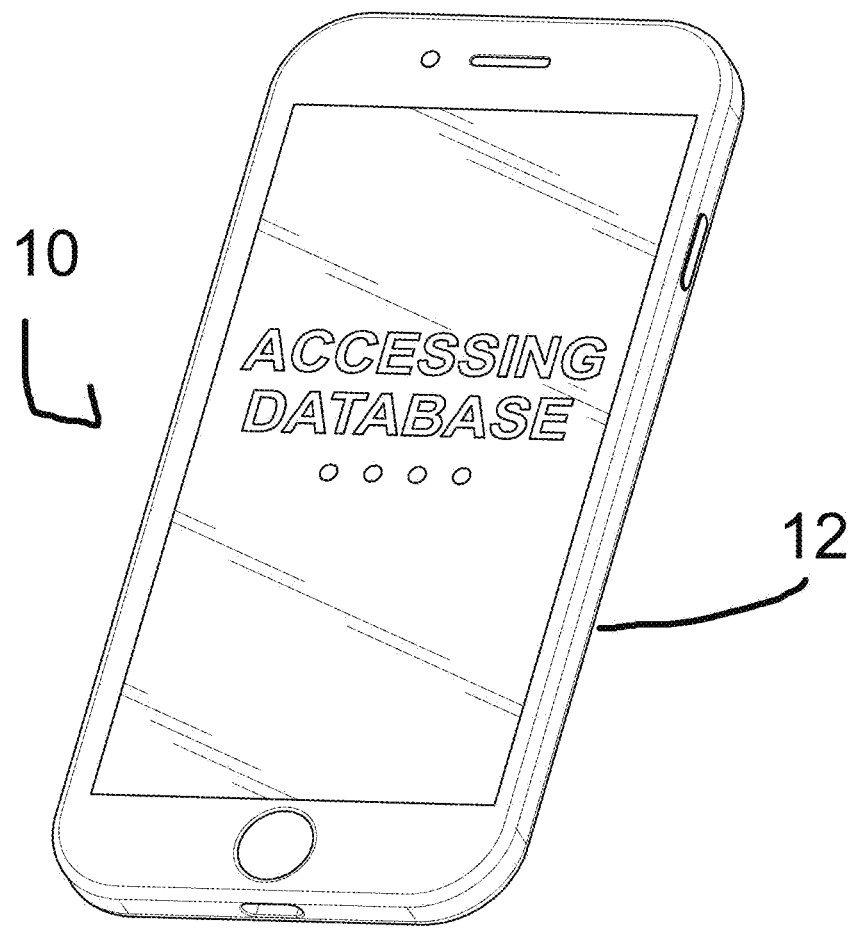
FIG. 8 shows a message on the interface for the computing device indicating that the device is accessing a remote database.
Figure 9:
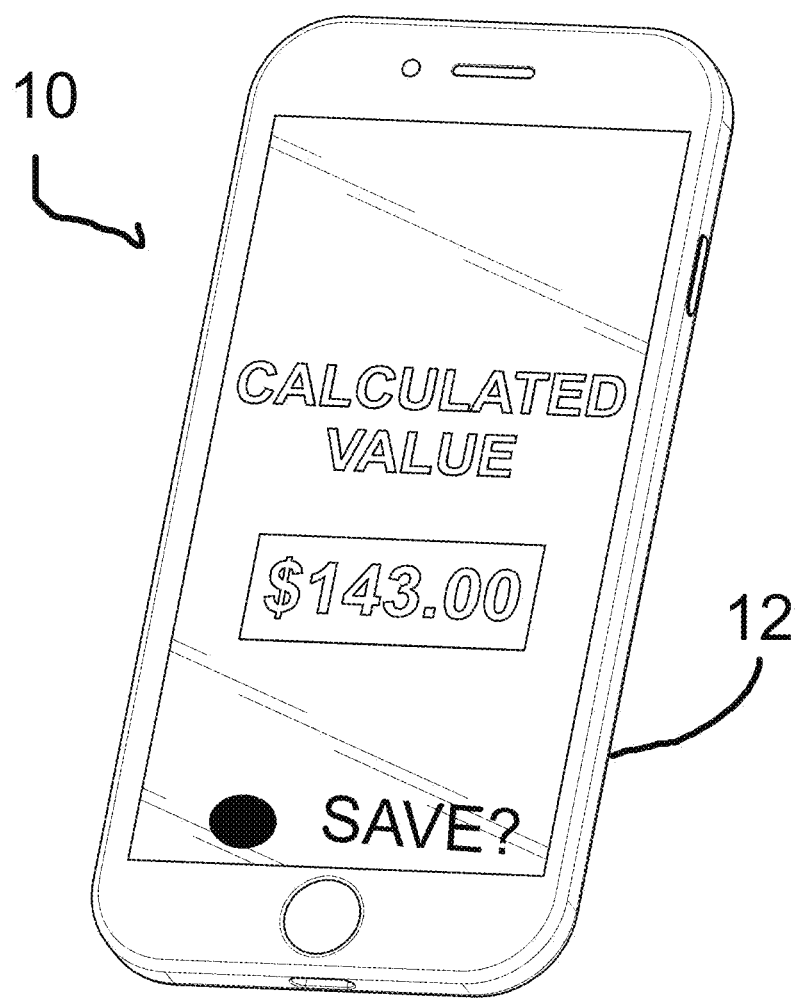
FIG. 9 shows the display of an identified value for a target coin as determined from a valuation library within a remote database.

The identified output images (front and rear), whether a video frame or an individual picture, then undergo further processing to provide for recognition of various elements of the target coin. As shown in FIG. 8, the interface on the device may—at any relevant time—provide an indication that the output image is now being further processed or when portions of the master database are being accessed. The further processing of the image may be incorporated into the app 10 retained on the device 12, may be part of a remote processor unit or, preferably, may be located within a cloud based processor. An example of a cloud-based option is illustrated generally in FIG. 11. The output image is sent to the cloud via an Application Programming Interface (API), which allows the device 12 to communicate with the remote processor and the various portions of the master database.

Figure 5:
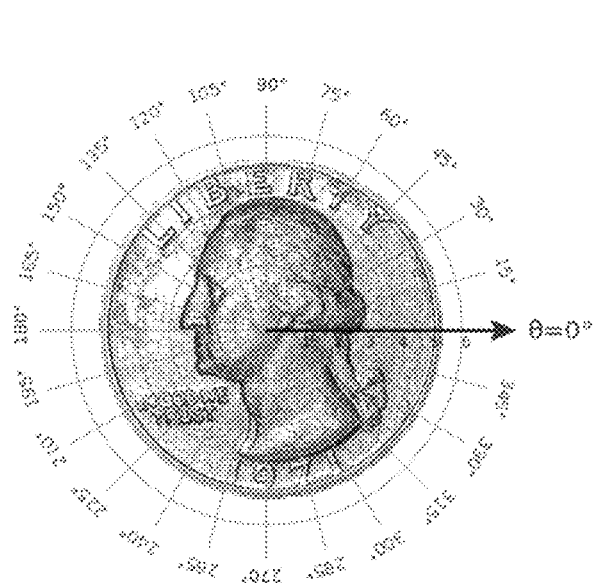
FIG. 5 shows a polar coordinate mapping of an output image of a coin.
Figure 6:
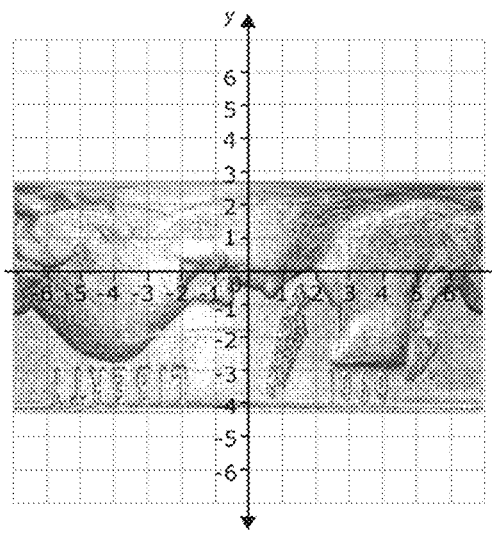
FIG. 6 shows a conversion of polar coordinates for the output image of FIG. 5 to a Cartesian coordinate mapping.

Once the output images are selected, the images are again processed to detect the outside edges of the target coin and design elements on the face of the coin. This further edge detection is also preferably accomplished using a Laplace filter. As part of the further processing, each image is assigned with a coordinate map. In the example of a coin, the initial mapping is based on polar coordinates as exemplified in FIG. 5. The designated polar coordinates are then converted to a Cartesian coordinate mapping such as that shown in FIG. 6. The conversion is preferably performed using standard formula. The coordinate conversion flattens out the curve of the coin and is contemplated to make it easier to detect and compare the identifying elements of the target coin, including the date, minting mark, other coin features and anomalies.

A Convolutional Neural Network (CNN) is preferably employed within the processor to analyze the pixel values in a 5 by 5 or similar coordinate grid and to compare the sum of the grids to stored data for known coin images. The processor compares the individual pixels within the mapped coordinates to all known coin types for both the heads and tails sides of the coins. Essentially, each pixel has a value and is compared to a training set of known coin images. The image is a histogram with the coin edges and design elements having been highlighted by the Laplace or similar digital filter. The CNN computation outputs weighted values relative to the training set images in the master database. In this manner, the coin country of origin, denomination or other variations are determined. A weighting of over 60% for a particular coin type is considered to be a positive identification. Hence, the CNN is used to identify the target coin by a comparison to the training set images. The training set of images retained within the master database is identified in FIG. 11 and may be broken down by various parameters of the currency. Preferably, data is stored for multiple countries of issuance, multiple coin denominations and for multiple variations within the coin denominations. As users continue to input images of additional coins, the training database is preferably expanded for use by the CNN.

Once the denomination of the target coin has been identified, further processing is performed to identify the date and minting mark (if present) within the digital image. Based on historical processing of the training set of currency, the approximate location of the date and minting mark are easily identified. A k-nearest algorithm is employed to locate all digits of the date. A k-nearest algorithm is a standard machine learning process that is normally applied to find similarities in data sets. With respect to the date determination, the process is looking for the pixels with the nearest points of commonality that approximate a date type characters within the image. Once the date is located, the method and system crops out the complete set of digits in the date. From the cropped date, the individual digits are then processed. The digit processing is based on a comparison to the training set for the standard numbers—digits 0 to 9. Preferably, the cropped date and digit portions of the image are compared to the digit date within the training set, without the need to convert the image to text. The pixel match for the image of the target coin with the training set determines a matching number and provides a match. The digit data is preferably stored separately for a specific coin denomination within the training set of the master database. Once the number match is determined, the date is identified within the method and system for the target coin.

Determination of the minting mark for the image of the target coin is performed in a similar fashion as the date. Other data within the image may also be processed in a similar fashion. The minting mark is typically located in certain portions of the coin. The coin denomination and date identification further narrow the options for the location of the minting mark. The location of the digit for the minting mark is more easily determined based on the processing of the coin image and its conversion to a Cartesian map. For US coins, the known minting marks are limited to a few options:

TABLE 1

| Mint Branch | Mint Mark | Years Mark Used |
| --- | --- | --- |
| Carson City (NV) | CC | 1870-1893 |
| Charlotte (NC) | C | 1838-1861 |
| Dahlonega (GA) | D | 1838-1861 |
| Denver (CO) | D | 1906-Present |
| New Orleans (LA) | O | 1838-1861, 1879-1909 |
| Philadelphia (PA) | P | 1942-45, 1979-Present |
| San Francisco (CA) | S | 1854-1955, 1968-Present |
| West Point (NY) | W | 1984-Present |

Once the minting mark is determined to be present, it is also processed from the output image using a k-nearest algorithm. The processing uses weighted comparison with the digit training set. It should be noted that for some coin types, it is possible that the minting mark is positioned on the front or back of a target coin. The coin denomination and date may dictate the front or rear image that is to be processed to locate the minting mark. Further, if the user disagrees with the determination of the date, minting mark or that a minting mark is not present, a further processing of the image may be conducted or a new image may be requested by the system. As an alternative, the user may be provided with the option to input the missing data or correcting inaccurate data. The user input data is then associated with the target coin and its associated images.

Figure 7:
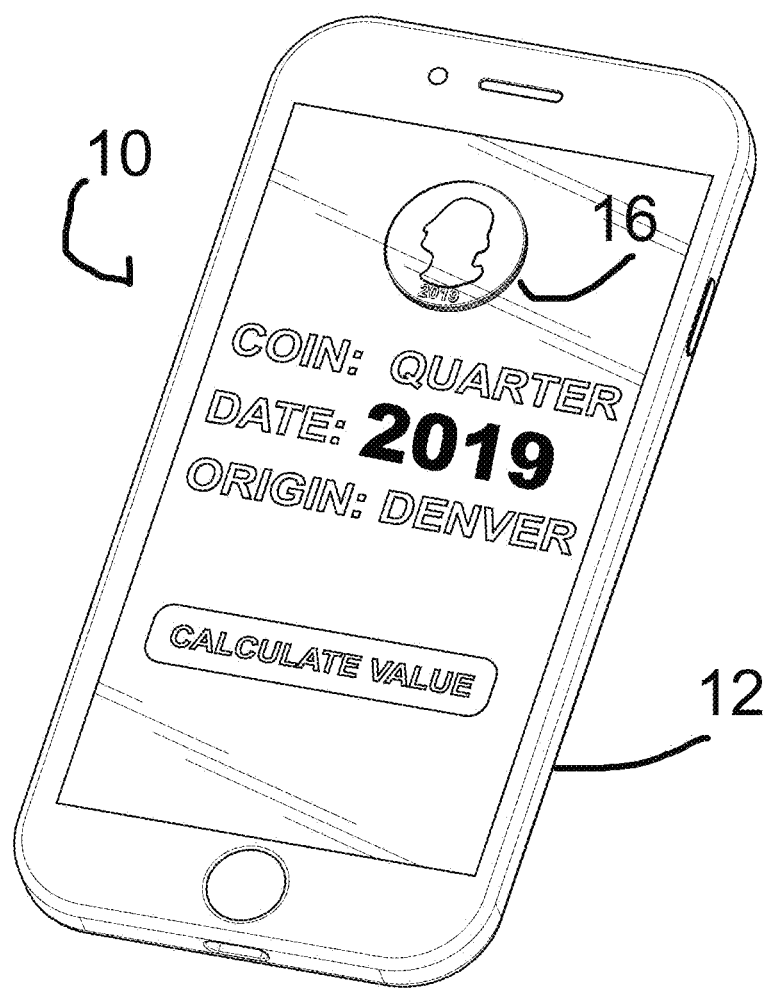
FIG. 7 shows display of identification information after processing of the digital image of the target coin.
Figure 11:
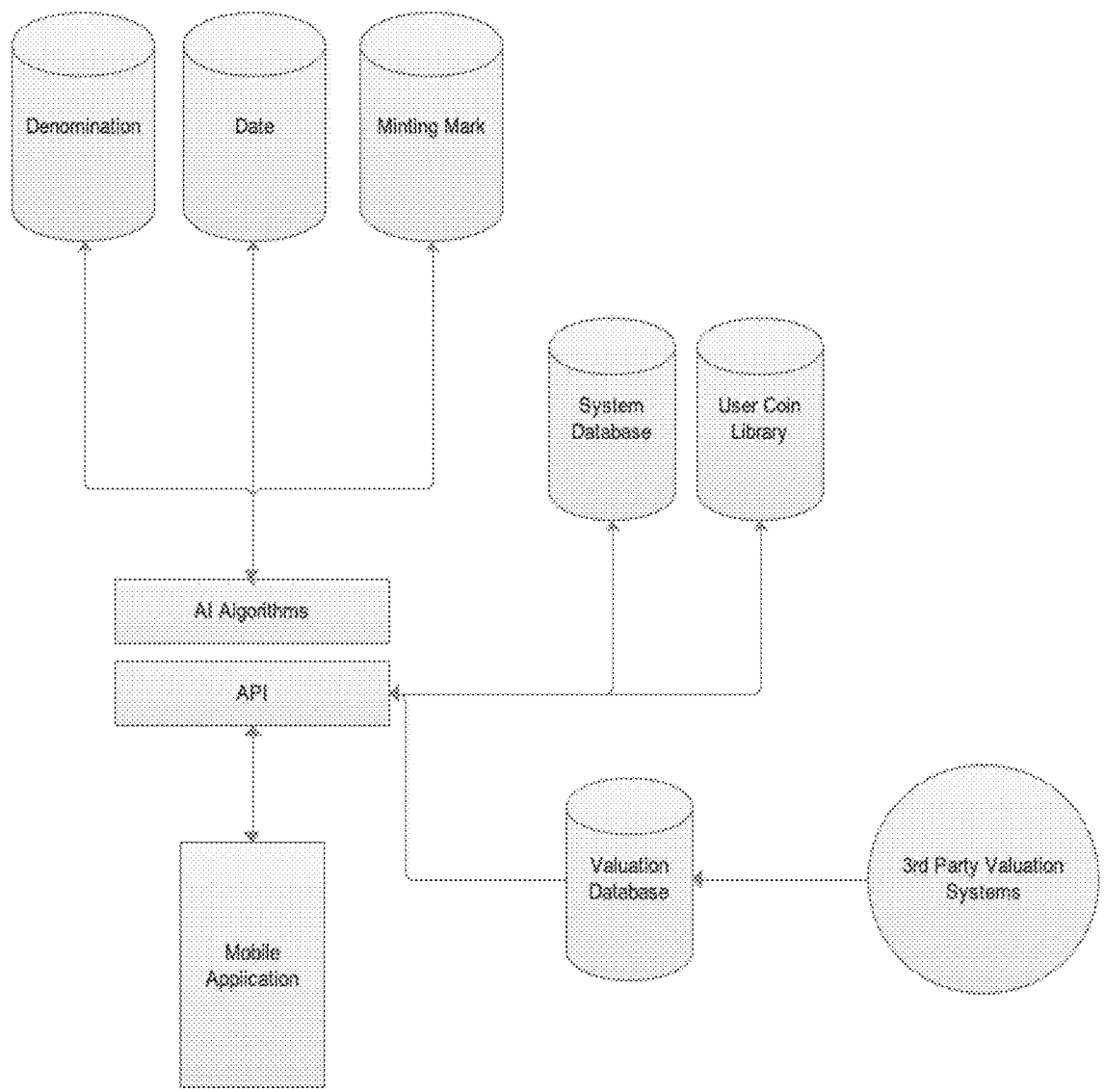
FIG. 11 shows an example of a communication flow within the contemplated method and system.

Once the coin denomination, date and minting mark (if any) are determined, the identifying information is returned to the device 12 for presentation on the user interface such as that shown in FIG. 7. Again, the user may be offer the opportunity to verify the information provided and incorrect information may be updated by the user through the interface. If any data needs to be corrected, at least two things preferably happen. First, the updated data becomes the basis of a lookup in a—typically separate—valuation database as shown in FIG. 11. Secondly, the images and the associated data/metadata are added to the training data sets within the master database to increase the accuracy of future processing. It is further possible that a verification of the updated image data be performed, using the corrected information to assist in the processing. This verification is contemplated to be similar to a supervised machine learning process. Additional errors may be identified and corrections prompted as part of this verification processing.

As a further part of the analysis, the method and system may confirm the currency side identified for an image. For example, should the output image be labeled as the front or heads side of the coin, but does not match any image data within the database, an error notification may be provided. Another possible validation of the output image may be based on the date or mint mark. If the date is not identified on the output image, then it is possible that the image has been mislabeled. Again, the user may then be instructed to retake the relevant side image for the target coin. A further alternative may be for the processor to investigate if the image has been mislabeled by a comparison to the alternate side image.

Anomalies in coins may also be detected through the method and system. Anomalies in coins are typically the result of manufacture errors and are sometimes call error coins. There are many anomaly varieties including off center struck coins, coins that show mechanical doubling, die breaks, indents, struck through errors, coins with curved or clipped planchets, double die coins, and coins with missing lettering, just to name a few. It is possible that certain anomalies may be detected through edge analyzation or other digital filters. The training data sets may include the known anomaly data for coins placed in circulation. Printing anomalies are also possible in paper currency and may be detected for the purpose of determining market value of a paper currency item. Hence, once the denomination, date and minting mark are detected, further review may be conducted for anomalies by reference to the training set data.

If the method and system is unable to detect anomalies, the user may be asked to provide other information that may affect the valuation process. Regardless of the amount of information determined or input into the system, the user may be provides with known details of the currency item based on information within the master database:

TABLE 2

Designer
Edge
Diameter
Weight
Mintage
Mint
Metal
Rarity & survival estimates
Auction records
Estimated value by condition The condition of the coin may also be processed and determined by further analysis. Adjustments in lighting, angle of the image, focus, etc. may affect this processing and needs to be accounted for. The size of the training database may also affect the capabilities of the method and system to detect various currency items. The larger the database, the more accurate the image may become.

Once the relevant data for the target coin is provided and confirmed by the user, a valuation estimate is retrieved from valuation databases. An identified value for the target coin is then returned via the user interface on the device 12. Preferably, multiple coin valuation information sources are included in the valuation database, which are preferably refreshed on a regular basis. The source for the valuation data may be provided to the user through the interface, along with links to additional information regarding the target coin. The identified valuation is preferably saved in the user's account or library, which may be stored internally within the device 12 and/or remotely as shown in FIG. 11. Other data points may be added by the user through the interface based on a visual inspection. Further, the input data may provide an update on valuation determined for the target coin. It should be understood that all valuation information is being provided as an estimate and is subject to verification of the user provided details by a potential buyer or expert.

Figure 10A:
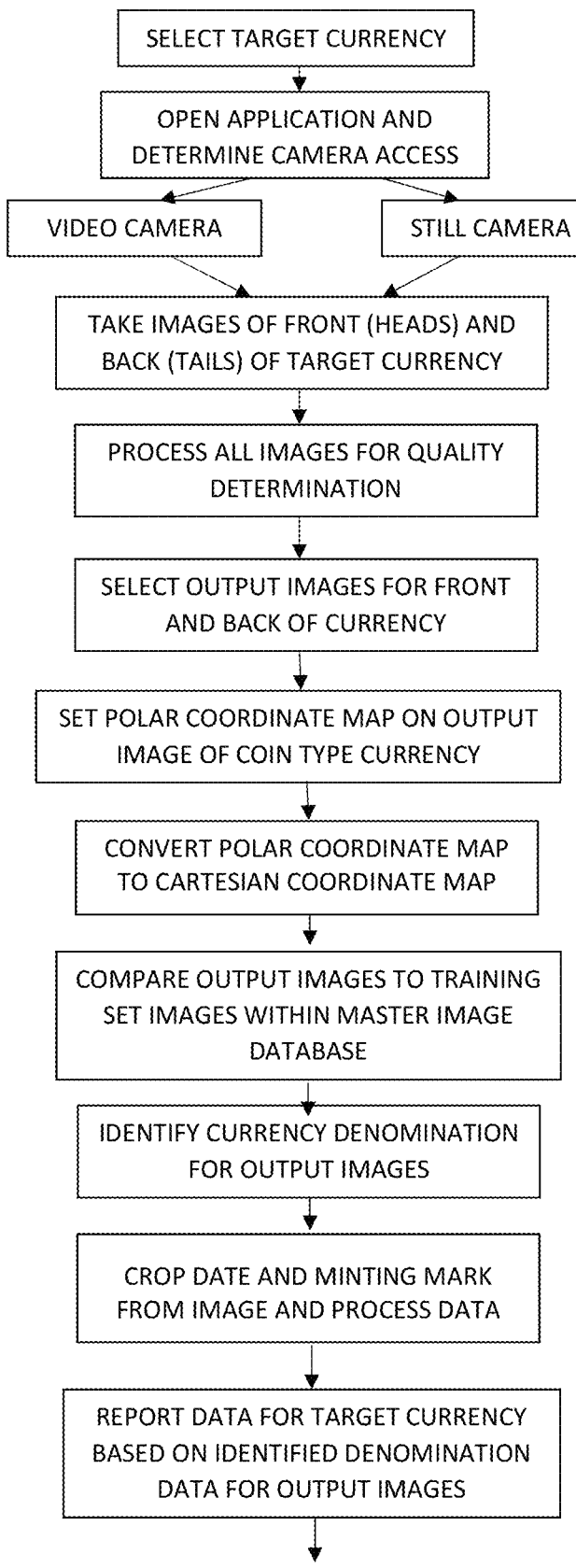
FIGS. 10A and 10B shows an example of flow of various potential processes and decisions within the contemplated method and system.
Figure 10B:
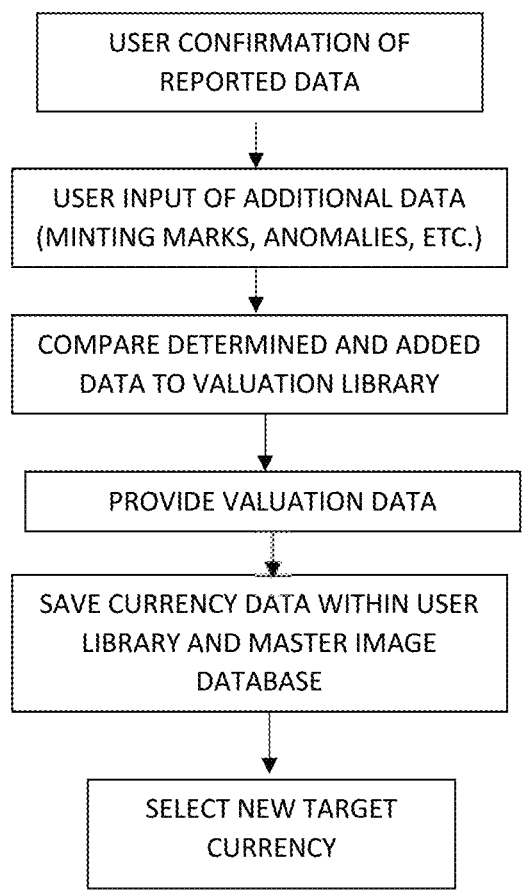

In FIGS. 10A and 10B there is shown one possible decision process for the contemplated method and system. As discussed herein, once the user selects a target currency item, the app is opened on the computing device. The app determines if it has access to a video camera or, if video is not accessible, to a digital still image camera. Again, it is preferred that a video burst be used to increase the potential for obtaining a quality image of the target currency. Images are taken for the front and back of the target currency item. The images are then processed and evaluated for quality. Preferably, Laplace or Sobel filters are applied to highlight the edges of the target currency. Once the quality evaluation is made, the method and system selects output images for the front and back of the currency.

The output images are further processed for comparison with a master database that includes a library of coin data, referred to as the training data sets in FIG. 11. A coin image is first assigned polar coordinates, which are then converted to a Cartesian coordinate map. Within mapped data, the image pixels are compared to the training set database. The denomination of the coin is first determined. Once denomination is identifies, the position of the date is determined along with other design features for the currency. The complete date is cropped from the image using a k-nearest algorithm. The individual date digits are then identified by comparison to the numerical image database—digits 0-9. The date will also lead to further matching within the training data sets. Minting marks and other data are also collected from the image processing and compared to data within the master database. Once the target currency item is identified through the image processing and data comparison, its descriptive information is reported to the user through the interface for the computing device. The user may be provided with an opportunity to verify and amend the reported data.

Using the data determined and input for the target currency, a valuation report is requested. The currency data is used to search a separate valuation database. The identified valuation based on the data for the currency item is reported to the user on the interface of the computing device. The data and identified valuation for the target currency device is preferably saved within a library associated with the user's account. The determined and input data is further associated with the currency images and preferably saved to the master database; for example, also becoming part of the training data set of FIG. 11. Once completed a new target coin may be selected.

Again, other currency items, such as paper money, may be similarly processed through the contemplated method and system. Paper currency includes images, serial numbers, dates, and other data that may be extracted for comparison to known identification data and potential value. The method and system preferably operates on a hand held or personal computer, providing quick and easy access to the collector value for individual currency items. As such, a value determination may be made by a user prior to returning the currency item back into circulation.

The present invention has been described and illustrated with respect to one or more exemplary embodiments. It should be understood by those skilled in the art from the foregoing that various other changes, omissions and additions may be made therein, without departing from the spirit and scope of the present invention, with the scope of the invention being described by the foregoing claims.

What is claimed is:

1. A method of identifying a currency item, comprising the steps of:
   providing a personal computing device having a connected and accessible image capture means and a user interface;
   capturing at least one image of a target currency item using the image capture means on the device;
   processing the at least one image of the target currency item to determine image quality by filtering the at least one image to detect design elements from the target currency item;
   further processing the at least one image by:
   assigning a coordinate map for the processed at least one image, comparing individual pixels of the processed at least one image based on the assigned coordinate map to a database of reference currency images, determining if a match is found between the at least one image and one or more reference currency images from the database, and processing the individual pixels based on the coordinate map to provide identifying information including date data and minting mark data for the target currency item;

displaying on the user interface of the device the identifying information and currency match determination for the target currency item;

determining value information from a valuation database by comparing the identifying information and the currency match determination for the target currency item; and displaying on the user interface of the device the value information determined for the target currency item.

2. The method of claim 1, wherein the personal computing device is a handheld mobile phone.

3. The method of claim 1, wherein the image quality determination is based on processing the at least one image with a Laplace filter.

4. The method of claim 3, wherein the processing with the Laplace filter is based on a computation of variances within the individual pixels and identification of a maximum over pixel values.

5. The method of claim 1, wherein the image capture means is a digital video camera.

6. The method of claim 5, wherein the digital video camera captures a video burst of the target currency item, the video burst having a plurality of individual frame images.

7. The method of claim 6, further comprising the steps of:
processing one or more of the plurality of individual frame images to determine the image quality based on processing with a Laplace filter, determining which of the plurality of individual frame images has the highest quality based on a computation of variances within the individual pixels and identification of a maximum over pixel values, and selecting the at least one image from the plurality of individual frame images of the target currency item for further processing based on the highest variance in conjunction with a high maximum.

8. The method of claim 1, further comprising the step of communicating with a master database for further processing the at least one image.

9. The method of claim 8, further comprising the step of storing within the master database the at least one image of the target currency item and its associated identifying information, currency match determination and value information.

10. The method of claim 8, wherein the valuation database and a user database are separately retained within the master database.

11. The method of claim 1, wherein a user database comprises the at least one image of the target currency item, the identifying information, and the value information.

12. The method of claim 1, wherein the target currency item is a coin.

13. The method of claim 12, wherein the coordinate map assignment within the further processing step further comprises the steps of:
assigning a polar coordinate mapping of the at least one image of the coin, and converting the polar coordinate mapping to a Cartesian coordinate mapping.

14. A system for identifying and valuing a target currency item, comprising:
a personal computing device having a connected and accessible image capture means and a user interface;

at least one digital image of a target currency item created by the image capture means on the device;

a processor for filtering the at least one digital image of the target currency item and for detecting design elements of the target currency item, the processor assigning a coordinate map to the at least one digital image, comparing individual pixels from the at least one digital image based on the coordinate map to a reference database of currency images, identifying a denomination match for the target currency item within the reference database and the processor further processing a date portion of the at least digital one image of the target currency item to determine a numerical match within the reference database;

a communication interface for providing the user interface on the personal computing device with the denomination match and the date portion for the target currency item;

the processor further identifying value information from a valuation database by comparing the denomination match and date portion to the valuation database; and displaying on the user interface of the personal computing device the value information determined for the target currency item.

15. The system of claim 14, wherein the personal computing device is a handheld mobile phone.

16. The system of claim 14, wherein the filtering process of the at least one digital image is performed by a Laplace filter within the processor.

17. The system of claim 16, wherein the Laplace filter within the processor is based on a computation of variances within the individual pixels and identification of a maximum over pixel values for outside edges of the target currency item within the at least one digital image.

18. The system of claim 14, wherein the image capture means is a digital video camera, the video camera capturing a video burst of the target currency item having a plurality of individual frame images,
wherein the processor filters each of the plurality of frame images to determine image quality based on a computation of variances within the individual pixels of edges of the target currency item and an identification of a maximum over pixel values, and wherein the processor selects the at least one digital image from the plurality of individual frame images of the target currency item having the highest variance in conjunction with a high maximum.

19. The system of claim 14, wherein the processor, the reference database and the valuation database are remoted from the personal computing device, and further comprising an interface for communicating between the personal computing device and one or more of the processor, the reference database and the valuation database.

20. The system of claim 14, wherein the coordinate map assignment by the processor includes assigning a polar coordinate mapping of the at least one digital image of the target currency item and converting the polar coordinate mapping to a Cartesian coordinate mapping prior to the comparing of the individual pixels between the at least one digital image and the reference database.

* * * * *

UNITED STATES PATENT AND TRADEMARK OFFICE
CERTIFICATE OF CORRECTION

| | | |
|---|---|---|
| PATENT NO. | : 11,704,957 B2 | Page 1 of 1 |
| APPLICATION NO. | : 17/406279 | |
| DATED | : July 18, 2023 | |
| INVENTOR(S) | : Armon Vincent et al. | |

It is certified that error appears in the above-identified patent and that said Letters Patent is hereby corrected as shown below:

On the Title Page

Item (71) Under Applicant, delete "Voorhees, NJ (US)" and insert -- Margate City, NJ (US) --.

Item (73) Under Assignee, delete "TSLoc Productions, Inc., Voorhees, NJ" and insert -- TSLOC Productions, Inc., Margate City, NJ (US) --.

Signed and Sealed this
Twelfth Day of September, 2023

Katherine Kelly Vidal
*Director of the United States Patent and Trademark Office*